No. 641,177. Patented Jan. 9, 1900.
McCLINTOCK YOUNG.
MACHINE FOR FORMING AND DRIVING STAPLES.
(Application filed Feb. 17, 1898.)
(No Model.) 11 Sheets—Sheet 1.

Fig. 1.

Witnesses: Inventor
McClintock Young
B. P. Y. Dodge
Attorney

Fig. 2.

No. 641,177. Patented Jan. 9, 1900.
McCLINTOCK YOUNG.
MACHINE FOR FORMING AND DRIVING STAPLES.
(Application filed Feb. 17, 1898.)

(No Model.) 11 Sheets—Sheet 3.

No. 641,177. Patented Jan. 9, 1900.
McCLINTOCK YOUNG.
MACHINE FOR FORMING AND DRIVING STAPLES.
(Application filed Feb. 17, 1898.)
(No Model.) 11 Sheets—Sheet 7.

No. 641,177. Patented Jan. 9, 1900.
McCLINTOCK YOUNG.
MACHINE FOR FORMING AND DRIVING STAPLES.
(Application filed Feb. 17, 1898.)
(No Model.)
11 Sheets—Sheet 9.

Fig. 14.
On line g-g
of Fig. 12 & 13.

Fig. 13.
On line h-h
of Fig. 14.

Fig. 16.

No. 641,177. Patented Jan. 9, 1900.
McCLINTOCK YOUNG.
MACHINE FOR FORMING AND DRIVING STAPLES.
(Application filed Feb. 17, 1898.)

(No Model.) 11 Sheets—Sheet 11.

Fig. 17.

Fig. 18.
On line i-i of fig. 3.

Fig. 19.

WITNESSES:
Arthur Ashley
G. S. Elmore

INVENTOR
McClintock Young
BY
P. T. Dodge
ATTORNEY.

UNITED STATES PATENT OFFICE.

McCLINTOCK YOUNG, OF FREDERICK, MARYLAND, ASSIGNOR TO THE PALMETTO FIBRE COMPANY, OF ILLINOIS.

MACHINE FOR FORMING AND DRIVING STAPLES.

SPECIFICATION forming part of Letters Patent No. 641,177, dated January 9, 1900.

Application filed February 17, 1898. Serial No. 670,681. (No model.)

*To all whom it may concern:*

Be it known that I, McCLINTOCK YOUNG, of Frederick, county of Frederick, and State of Maryland, have invented a new and useful Improvement in Machines for Forming and Driving Staples, of which the following is a specification.

This invention has reference to a staple forming and driving machine designed more particularly for use in the manufacture of boxes of the character described and illustrated in Letters Patent of the United States No. 570,530 issued to me on the 3d day of November, 1896, although the machine is adapted for other purposes, as will more fully appear hereinafter.

The machine of the present invention is a power-driven mechanism under the control of the attendant and embodies automatically-operating devices for successively forming staples from a length of wire and successively driving the staples into the parts of the box or other object acted on; and the invention consists in improved devices of simple construction for effecting these operations with certainty and rapidity.

The invention also consists in the details of construction and combination of parts hereinafter described and claimed.

In the accompanying drawings, Fig. 15 is a longitudinal sectional elevation of the same on the line $h\,h$ of Fig. 14.

Referring to the drawings, 1 represents a frame of a form and construction adapted to give support to the operative parts of the machine. This frame consists of a flat base-plate 2, adapted to rest on the floor, a vertical post or standard 3, rising from one side of the base-plate and curved laterally at its upper end to overhang the base-plate, and a bracket or head 4, attached to the overhanging end of the standard and giving support to the main operative parts of the machine, which receive their motion through the medium of a vertically-arranged driving-link 5 from a horizontal main driving-shaft 6, mounted in bearings 7 and 8 on the base-plate, the lower end of this driving-link being jointed to a crank-pin 9 on a crank-disk on one end of said shaft, the opposite end of the shaft being provided with a driving-pulley 10, clutched to the shaft by a clutch mechanism 11 under the control of the operator, as will be more fully described hereinafter.

The bracket 4 is formed in its edge with an open slot 12, above which is mounted a vertically-reciprocating staple bending and cutting slide 13 and a vertically-reciprocating staple-driving slide 14. Below the slot the bracket gives support to an anvil 15, in conjunction with which the bending-slide operates, a horizontally-reciprocating ejector $15^\times$ for advancing the staple beneath the driving-slide, and a staple-guide 16, in which the staple is received and temporarily held in position to be acted on by the driving-slide.

Figure 1:
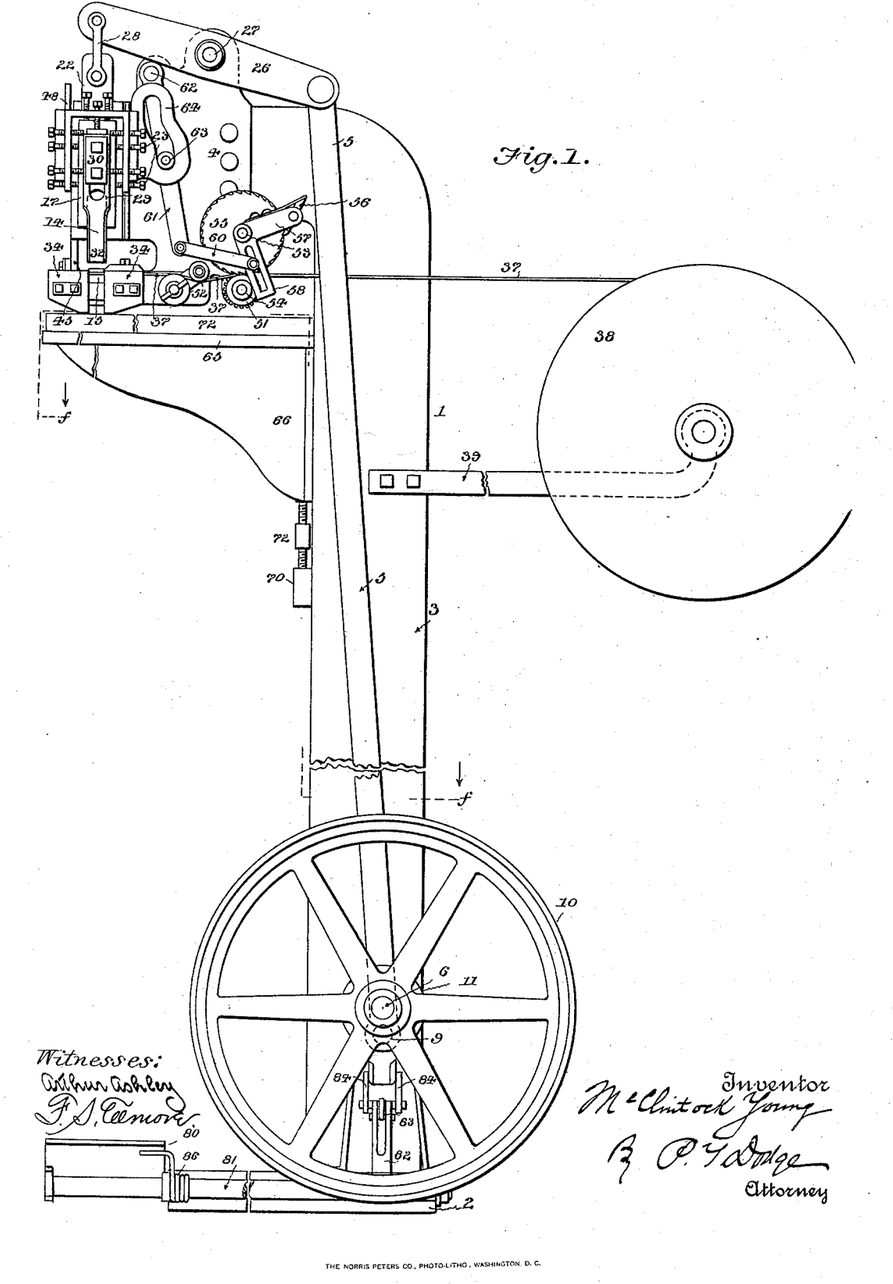
Figure 1 is a front elevation of the machine.
Figure 2:
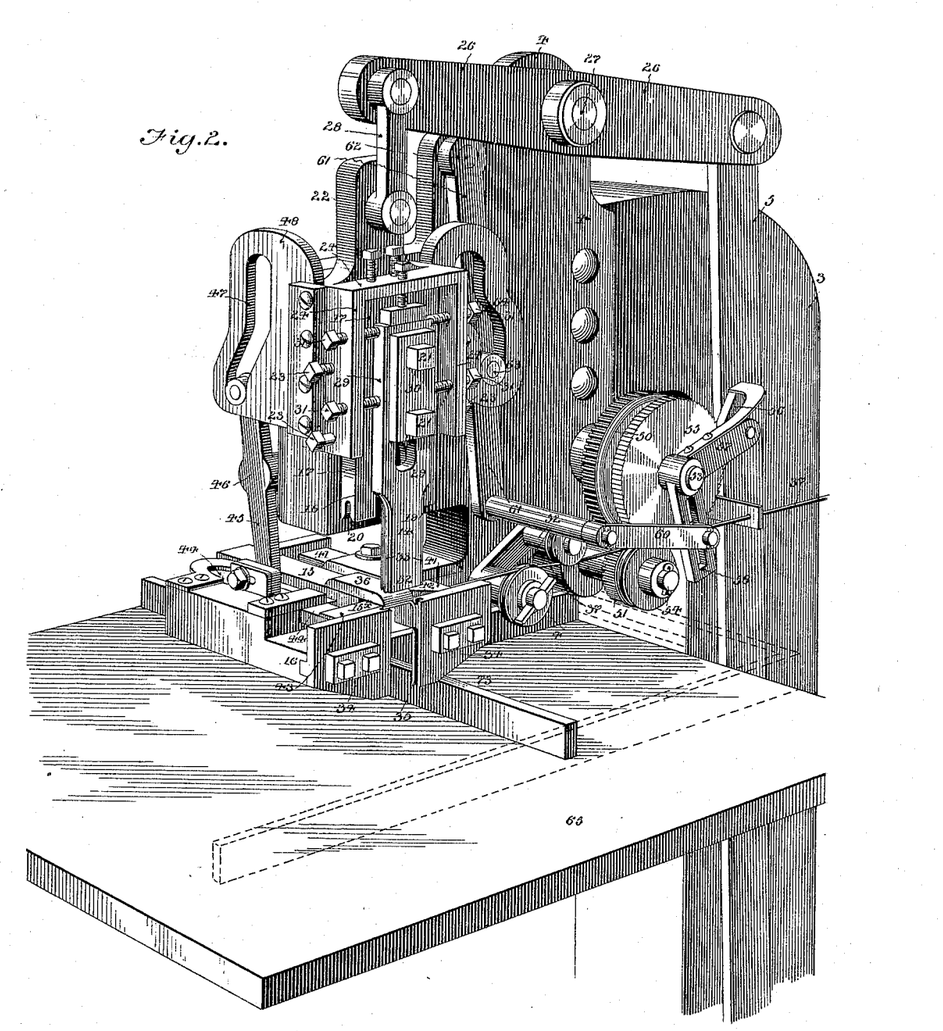
Fig. 2 is a perspective view of the upper portion of the same, showing the main operative parts.
Figure 3:
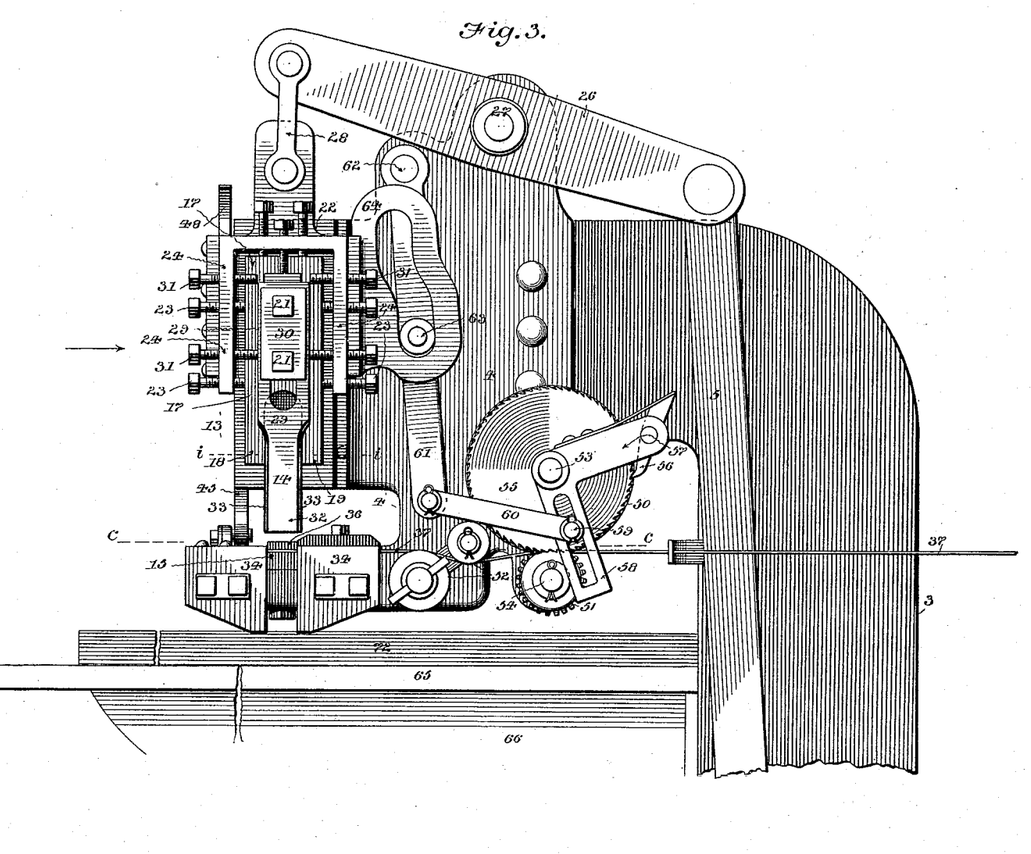
Fig. 3 is a front elevation of said parts in the position they occupy previous to the formation and driving of the staple.
Figure 4:
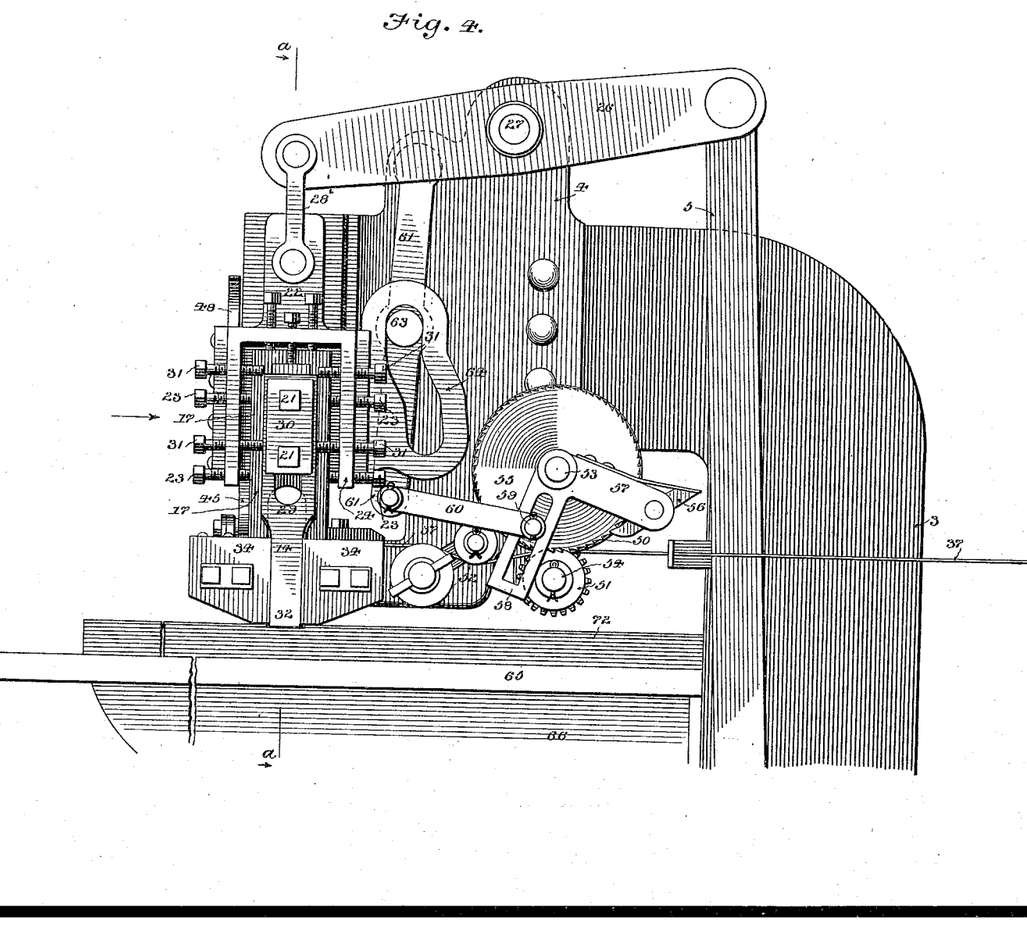
Fig. 4 is a similar view showing the parts in the position they occupy when forming and driving the staples.
Figure 5:
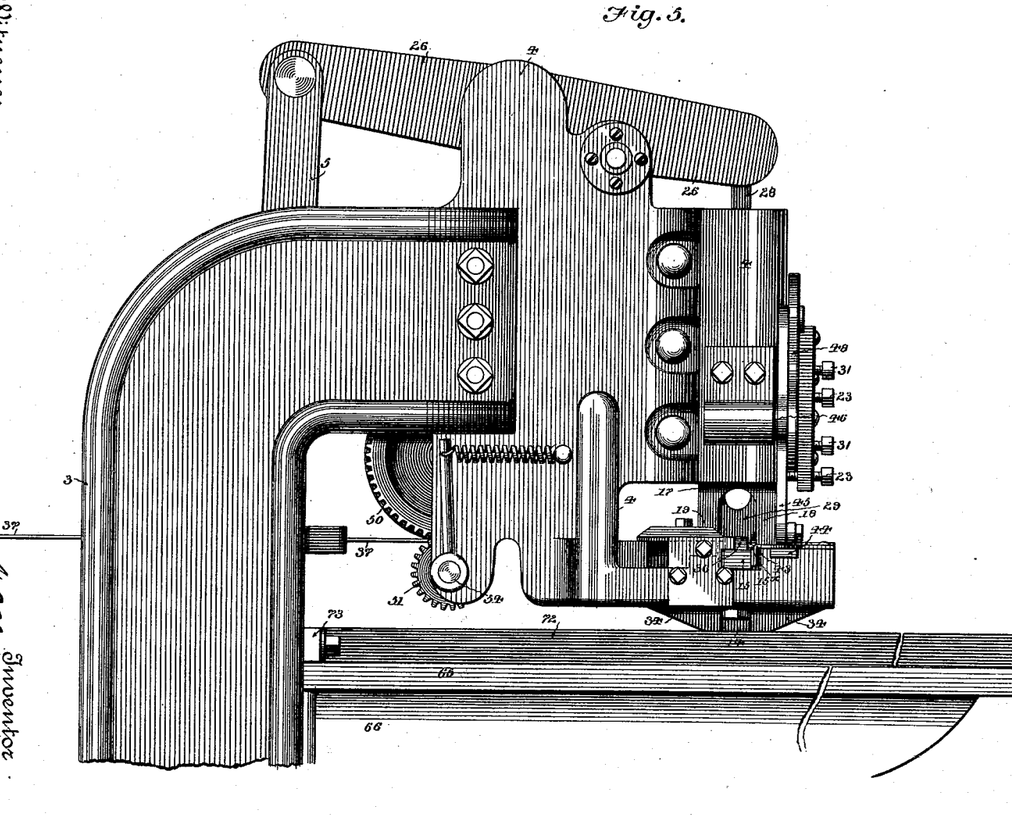
Fig. 5 is a rear elevation of the same.
Figure 7:
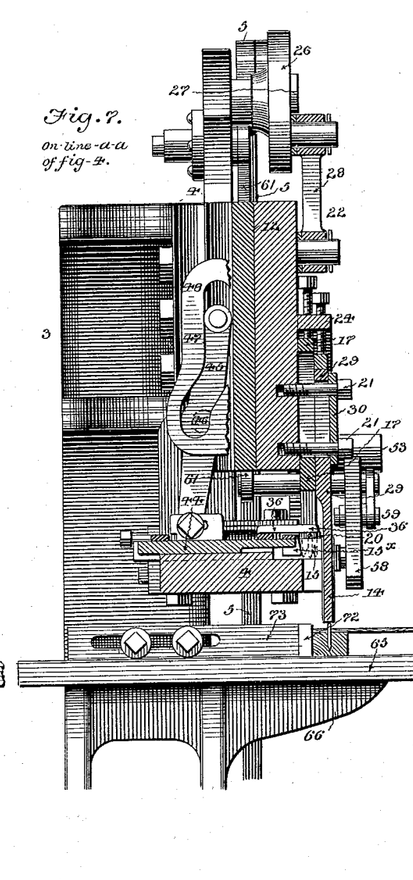
Fig. 7 is a vertical sectional elevation on the line $a\,a$ of Fig. 4.
Figure 8:
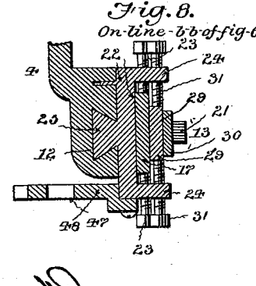
Fig. 8 is a horizontal sectional view on the line $b\,b$ of Fig. 6.
Figure 18:
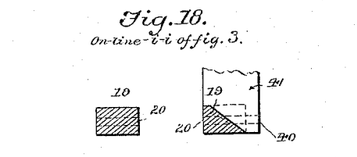
Fig. 18 is a horizontal section on the line $i\,i$ of Fig. 3, showing the form of the bending-slide and adjacent wire-cutting die.
Figure 19:
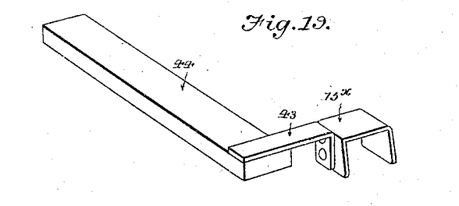
Fig. 19 is a perspective view of the staple-ejector removed from the machine.

The staple cutting and bending slide consists of a vertical plate 17, Figs. 3, 7, and 8, having its lower end forked to form two bending-fingers 18 and 19, as shown in Fig. 18, which when the slide is lowered will extend on opposite sides of the anvil. The lower ends of these fingers are each formed with an open slot or recess 20, extending transversely of the anvil, in which slots the wire to form the staple is received when the slide moves downward. The plate is clamped fixedly, but adjustably, in position by bolts 21, extending through a vertical central slot therein and into a vertically-reciprocating main plate 22 and is adjustably held on the main plate by adjusting-screws 23, extending through a flange 24 on the main plate and bearing against the edges of the plate 17. The main plate 22 is provided on its rear face with a dovetail 25, sliding in a corresponding guiding-groove in the front face of the overhanging bracket 4, as shown in Fig. 8. This main plate 22 is reciprocated vertically by means of a walking-beam 26, Fig. 2, pivoted, as at 27, to the bracket and connected at one end to the main plate by a link 28, its opposite end being jointed to the upper end of the main driving-link 5, before alluded to.

The driving-slide 14 consists of a vertical plate 29, slotted centrally and applied to the outer side of the plate of the bending-slide, being clamped thereto by the bolts 21 and washer 30, and the plate is securely held in position and may be adjusted by means of the adjusting-screws 31, extending through the flange on the main plate and binding against the edges of the plate 29, this construction insuring the sustaining of the bending-slide and driving-slide in fixed relations, so that they move together with the main reciprocating plate 22. The lower end of the plate 29 terminates some distance below the lower forked end of the bending-slide and is fashioned into a staple-driving finger 32, having ribs 33 on its opposite edges adapted to fit within the staple-guide, which latter consists of two plates 34, fixed to the lower portion of the bracket 4 at its front a distance apart corresponding to the width of the staple and vertically in line with the staple-driving slide. These plates 34 are provided in their adjacent edges with vertical grooves 35, in which the ribs on the driving-finger extend and in which the staple is temporarily held in position to be acted on by the driving-finger, as shown more particularly in Figs. 2 and 9.

Figure 10:
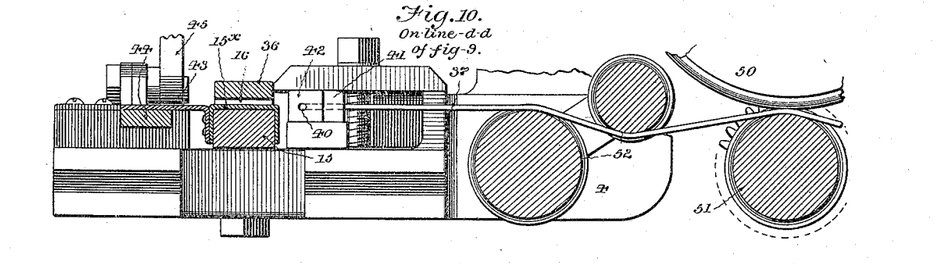
Fig. 10 is a vertical sectional elevation on the line $d\,d$ of Fig. 9.
Figure 11:
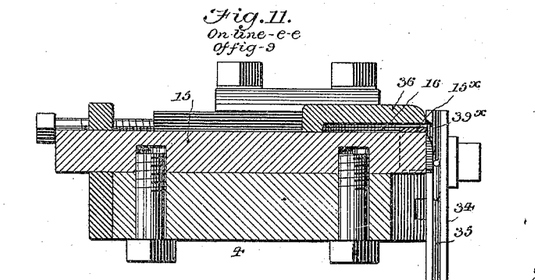
Fig. 11 is a horizontal section on the line $e\,e$ of Fig. 9.

The anvil in conjunction with which the bending-slide operates extends fore and aft and is supported in a fixed position vertically beneath the bending-slide. As shown in Figs. 7, 10, and 11, it is provided with a forwardly-extending horizontal overhanging finger 36, between which and the top of the anvil the wire 37 to form the staple is fed from a reel 38, mounted on an arm 39, projecting from the standard. The finger and anvil terminate just within the plates forming the staple-guides, the sides of the latter adjacent to the anvil being cut away, as at 39×, Fig. 11, to admit of the entrance of the staple within the guide when the former is pushed by the ejector, as more fully described hereinafter.

Figure 9:
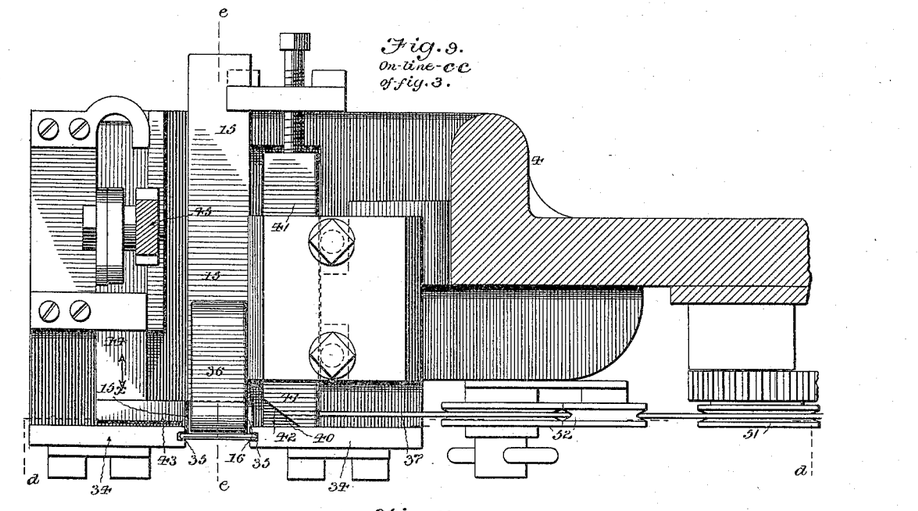
Fig. 9 is a horizontal sectional view on the line $c\,c$ of Fig. 3 looking downward.

The wire from the reel before it passes over the anvil extends through a hole 40 in a die-plate 41, Figs. 9 and 10, fixed a short distance to one side of the anvil, the side of this die adjacent to the anvil being beveled or inclined, as at 42, to form a cutting-surface, in conjunction with which the edge of the bending-finger 19 operates. The edge of this finger is beveled similarly to the die-plate, and when moved downward it acts on the wire to sever it at an angle and forms a sharp point. The wire being fed by the mechanism, presently to be described, through the die and over the anvil beneath the bending-slide, with its end projecting beyond the anvil a distance corresponding to the leg of the staple, the bending-fingers on descending will engage with the wire on opposite sides of the anvil and the wire will enter the recesses in the lower ends of the fingers. On the continued downward movement of the fingers the wire will be severed and the projecting portions will be bent downward along the sides of the anvil, forming a staple with parallel sharpened legs. The bending-slide then rises, and simultaneously the ejector-slide moves forward and pushes the staple into the staple-guide.

Figure 6:
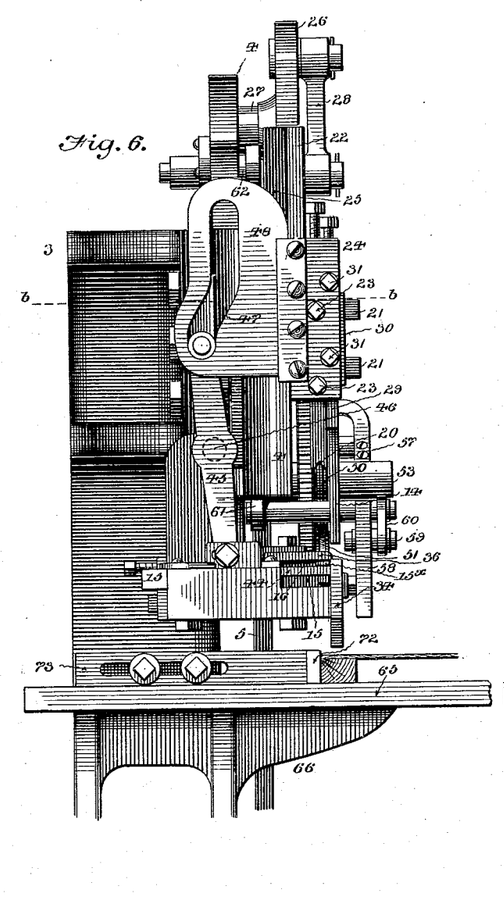
Fig. 6 is an end elevation as viewed in the direction of the arrows in Figs. 3 and 4.

The ejector is in the form of an inverted-U-shaped plate, Fig. 10, which fits over the anvil beneath the overhanging arm 36 and in rear of the staple formed thereon. To one side of the ejector an arm 43 is fixed, which is connected to a slide-plate 44, mounted to move back and forth in a guiding-groove in the lower projecting portion of the bracket 4. The slide-plate is pivoted to the lower end of an operating-lever 45, Fig. 6, mounted to rock on a stud 46 on the side of the bracket, and its upper end is provided with a friction-roller extending in a cam-slot 47 in a rearwardly-extending cam-plate 48, fixed to the vertical reciprocating main plate 22, as shown in Figs. 6 and 8. This cam-slot extends at a forward inclination from its lower end, the result being that on the descent of the cam-plate, bending-slide, &c., the upper end of the rocking lever 45 will be carried forward and the ejector moved rearward, and on the ascent of the parts the ejector will be moved forward and will push the staple just formed into the staple-guide.

The mechanism for feeding the wire over the anvil from the reel comprises intermittently-rotating upper and lower feed-rolls 50 and 51 and tension-rolls 52. The wire from the reel extends between the two feeding-rolls, the lower one having a groove in its periphery in which a peripheral rib on the upper roll extends, this arrangement insuring a positive contact of the rolls with the wire, so that by the rotation of the rolls the wire will be positively advanced. The upper drive-roll is mounted on a stud 53, projecting from the bracket 4, and the roll has gear-teeth meshing with teeth on the lower driving-roll, which is mounted on a stud 54, projecting from the bracket, this arrangement causing the rolls to be rotated together in opposite directions to feed the wire. The stud on which the upper feed-roll is mounted extends outward and has fixed to it a ratchet-disk 55, the teeth of which are engaged by a pawl 56, pivoted in the end of an arm 57, mounted loosely on the end of the stud. This arm has an angular extension 58, containing a slot in which a pin 59 is adjustably mounted. A link 60 has one end jointed to this adjustable pin and its other end jointed to the lower end of a pendent lever 61, pivoted at its upper end to the bracket, as at 62. About midway of its length this lever is provided with a friction-roller 63, engaging in a cam-slot in a plate 64, projecting from the side of the main reciprocating plate 22. The cam-slot extends at an inclination to the left from its lower end, the result being that on the ascent of the main plate carrying the bending and driving slides the lower end of the pendent lever will be carried to the right, and the pawl 56 slipping over the ratchet-disk the feed-rolls will remain stationary. On the descent of the parts the pendent lever will be carried to the left, the pawl engaging the teeth, the feed-roller will be turned, and the wire fed forward through the cutting-die and over the anvil.

The operation of my machine is as follows: Motion being imparted to the main driving-shaft, before alluded to, the driving-lever 5 will be vibrated vertically and will cause the walking-beam to rock on its axis, which will in turn cause the main reciprocating plate 22, carrying the bending-slide and driving-slide and the two cam-plates operating the ejector and wire-feeding mechanism, to alternately ascend and descend. Assuming that to start the formation of the staples the wire has been fed through the cutting-die and over the anvil the proper distance and that the parts are in their elevated position, as shown in Figs. 2 and 3, on the descent of the parts the ejector on the first part of the downstroke will be started to the rear to clear the way for the wire, and on the second part of the downstroke the pawl will engage the teeth on the disk, turn the feeding-roller, and advance a length of wire over the anvil, and on the last part of the downstroke the bending-fingers will engage the wire on the anvil, sever it, and immediately thereafter bend the ends downward over the anvil, thereby forming a staple. On the first part of the upstroke the ejector remains in its retracted position, and on the last part of the upstroke it moves forward and pushes the staple into the staple-guide, the pawl at the same time slipping over the teeth of the disk for a new hold. In the first part of the following downstroke the driving-tool, which, as described, extends some distance below the bending-fingers, will act on the previously-formed staple in the guide and start to drive the same downward, and on the second part of the stroke the wire will be fed as before and on the last part will be bent and a new staple formed, the driving-slide in the meantime completing the driving of the staple. On the ascent of the parts the staple just formed will be pushed to the staple-guide to take the place of that just driven. It is seen, therefore, that the operation of forming and driving the staples is continuous, both the bending-slide and driving-slide operating on the downstroke and the latter operating on the staple formed by the previous operation of the bending-slide.

Figure 16:
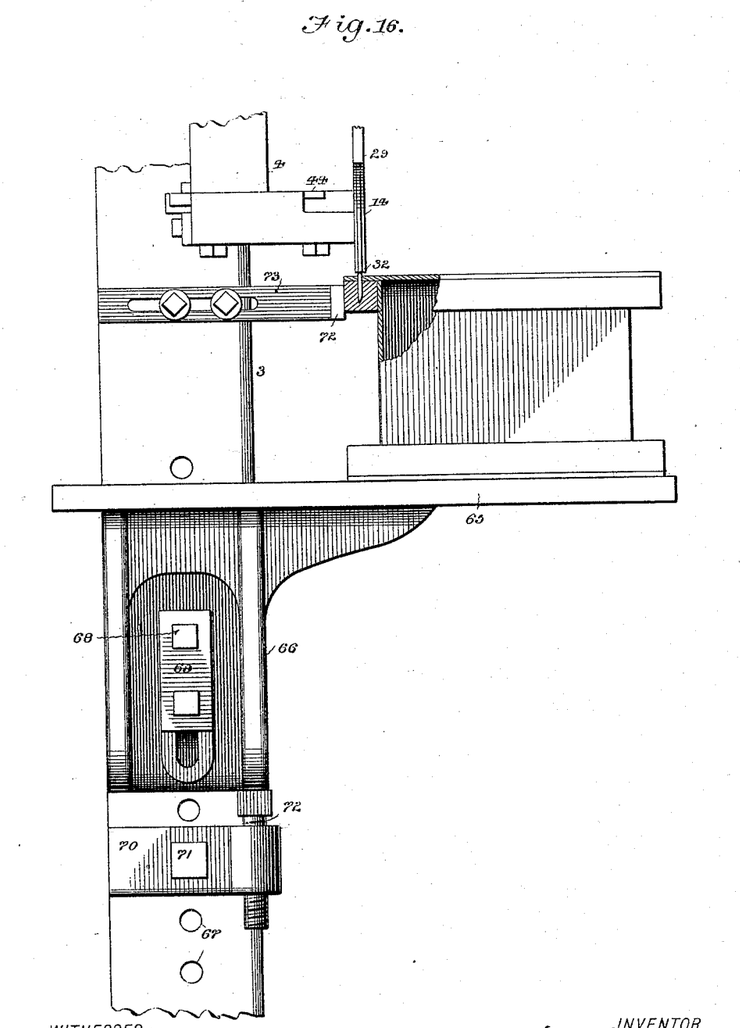
Fig. 16 is an elevation of the driving mechanism and supporting-table, showing a box thereon.
Figure 17:
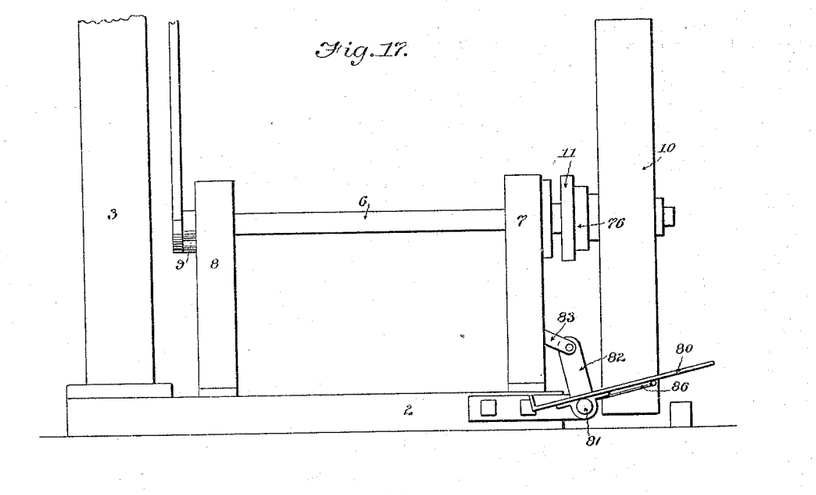
Fig. 17 is a front elevation of the lower part of the machine, showing the main drive-shaft and adjacent parts.

The object acted upon is supported on a table 65, sustained by a bracket 66, Fig. 16, beneath the driving-slide. To meet the conditions encountered in practice, as regards the different kinds of work to which the machine is adapted, it is desirable that the table be adjusted vertically, and to effect this with facility and nicety I form in the post or standard of the frame a series of holes 67, adapted to receive bolts 68 for securing the bracket in position. The latter is formed with a vertical slot through which the bolts extend, and a washer 69 is applied to the front of the bracket beneath the heads of the bolts. This arrangement will admit of the setting of the table at different distances from the driving-tool, and when adjusted the table may be moved up or down to a limited extent by loosening the bolt. In order that this latter adjustment may be effected with nicety, I propose to apply to the post beneath the bracket a secondary bracket 70 and secure the same by a bolt 71, extending in one of the holes in the post. One edge of this secondary bracket is tapped to receive a vertical screw-bolt 72, which is seated with its head bearing beneath the lower end of the bracket. By loosening the bolts, securing the main bracket, and turning this screw 72 the table may be adjusted with ease to any point within the limit of the slot in the bracket, and then the bolts 68 being again tightened the table will be held firmly in the desired position.

Figure 12:
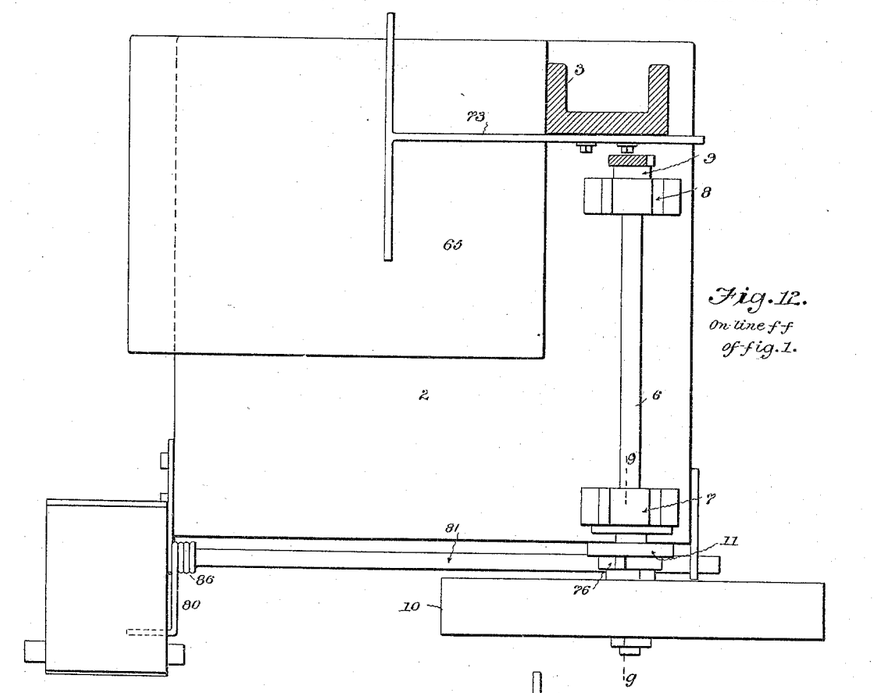
Fig. 12 is a horizontal sectional view on the line $f\,f$ of Fig. 1 looking downward.
Figure 13:
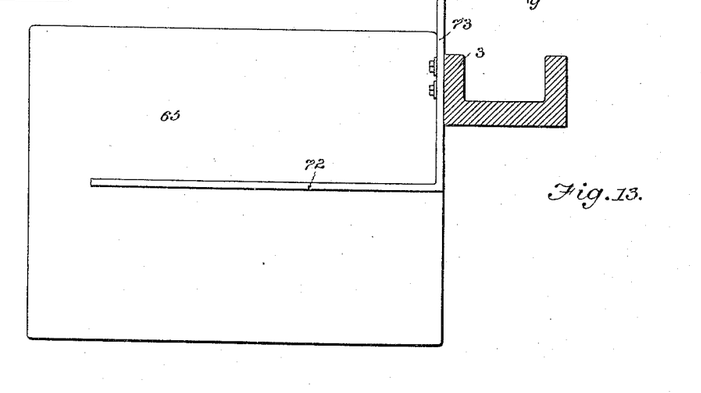
Fig. 13 is a sectional view showing a modification of a detail.
Figures 13, 14:
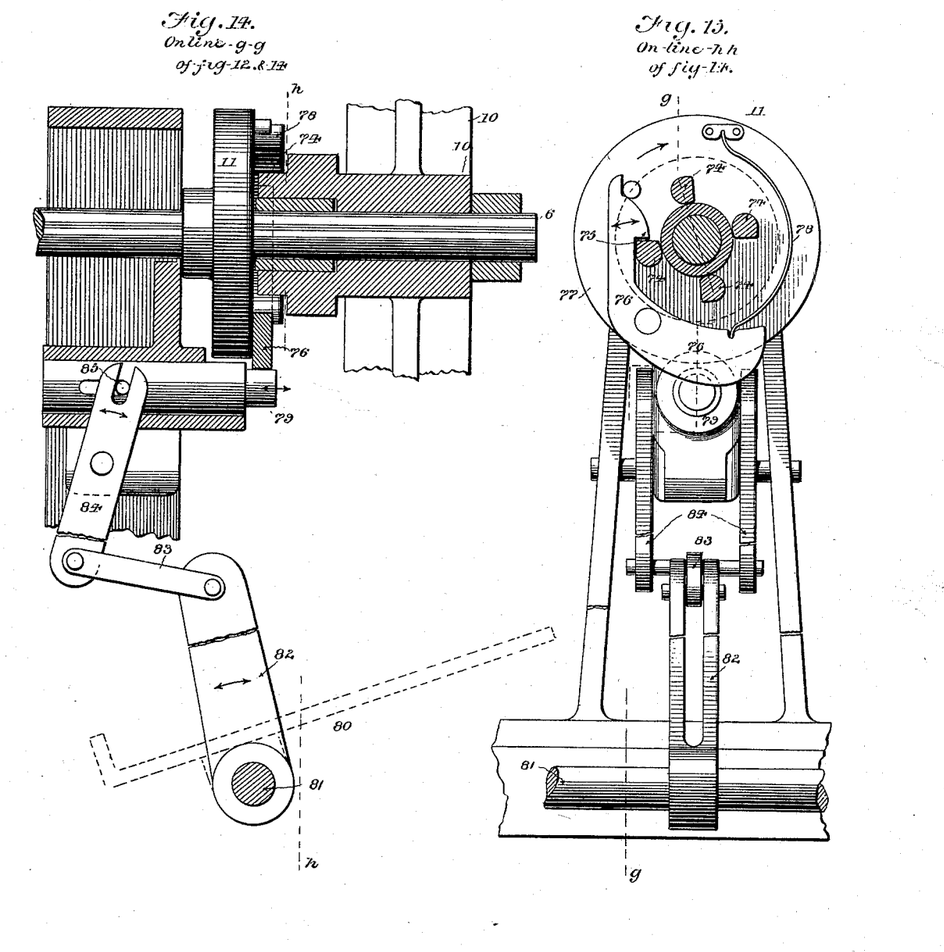
Fig. 14 is a transverse sectional elevation of the clutch mechanism on the line $g\,g$ of Figs. 12 and 15.

In forming boxes by the present machine of the construction described in my Letters Patent above referred to the sides of the boxes are first secured to the exterior strips, and the four sides are then assembled and the top and bottom sheets applied. In securing the sides to the strips in the present machine the strips are laid on the table beneath the driver and the sheet laid upon the strip and the table adjusted close to the driver, as shown in Figs. 6 and 7, and the descent of the driver forces the staple through the sheet and into the underlying strip. In applying the tops and bottoms to the box the table is adjusted farther away from the driver, as shown in Fig. 16, and the top is placed on the upper strip and the staple driven as shown in said figure. In performing these operations it is desirable, though not absolutely essential, that some means be provided for maintaining the box or the strip, as the case may be, in its proper position in relation to the driver, so that the staples may be driven with uniformity and in the right positions. To effect this, I propose to employ a gage-plate—such, for instance, as represented in Fig. 13, consisting of a vertical plate 72, extending parallel with the driving-slide a slight distance in rear of the same and connected to the post 3 by means of an arm 73. In use the box or strip is pushed against the gage-plate 72, and after one staple is driven is moved along to one side to receive another staple, which will be driven in line end to end. As shown in Fig. 12, the gage-plate may be arranged transversely of the driving-slide and connected by means of the arm 73× to the front of the post. In the use of this device, the part to be acted on being held against it, the staples will be driven side by side parallel to each other. It is obvious that gages and guides of various forms may be employed in connection with my machine, according to the different kinds of work operated on.

In order that the machine may be under the perfect control of the attendant to enable him to stop or start its operation quickly, I connect the driving-pulley to the driving-shaft by means of the clutch 11 before alluded to. The drive-pulley has its hub mounted loosely on the projecting end of the shaft, and the inner end of the hub is provided with a series of angular pins 74, which are adapted to engage a nose 75 on the end of a pivoted dog 76, mounted on the adjacent face of a disk 77, fixed to the drive-shaft. The dog is acted on by a spring 78, which tends to hold the dog, with the nose, in the path of the pins. The dog has its free end curved on its outer edge, and when the angular pins are in engagement with the dog this curved edge will extend beyond the edge of the disk. In this position the motion of the drive-pulley will be transmitted to the shaft through the pins and dog. To arrest the motion of the shaft, I provide a horizontal reciprocating stud 79, adapted to be moved in the path of the curved edge of the dog, so that when the latter is carried around by the disk it will be moved on its axis and its nose will be disengaged from the pins on the hub, and the motion of the shaft will be arrested. This stud is mounted to slide horizontally in a guide-socket in the bearing on the base-plate and is moved by a foot-treadle 80, fixed to one end of a rock-shaft 81, mounted in bearings in the base-plate. The other end of the rock-shaft, has fixed to it an arm 82, extending upwardly and connected by a link 83 to a lever 84, pivoted to the bearing and having its upper end slotted to receive a pin 85, projecting from the side of the stud. The foot-pedal is held normally in an elevated position by a spring 86, Figs. 2 and 12, and in this position the stud 79 is projected and causes the disengagement of the pulley and shaft. On the depression of the foot-lever the stud is retracted, and the spring, acting on the end of the dog, throws its opposite end in the path of the angular pins on the hub, and the motion of the latter is transmitted to the driving-shaft. The attendant therefore normally holds the pedal downward to operate the machine, and when it is desired to stop the motion of the machine he simply removes the pressure of his foot and the spring, bearing on the pedal, will elevate the same and will cause the projection of the stud and disengagement of the shaft.

Having thus described my invention, what I claim is—

1. In a machine of the character described the combination of an anvil, a guide in advance of the same, a reciprocating staple-former and a reciprocating driver sustained in relatively-fixed relations, a reciprocating ejector adapted to engage the staple on the anvil and move it to the guide, a wire-feeding mechanism adapted to advance the wire over the anvil, an ejector-operating device, as plate 48, movable with the staple-former and staple-driver, a device for operating the wire-feeding mechanism as plate 64, also movable with the former and driver, and suitable connections between the said plates and the ejector and wire-feeding mechanism, constructed to cause the wire to be fed to the anvil on the advance of the former and driver and the staple to be moved to the guide, on the retraction of the former and driver.

2. The combination with a horizontal anvil, of a main vertically-reciprocating plate, means for reciprocating the plate, a vertically-reciprocating combined wire cutting and bending device fixed to and movable with said plate, a wire-feeding mechanism adapted to advance the wire over the anvil beneath the cutting and bending device, an ejector embracing the anvil and movable back and forth thereon and acting to engage the staple and advance the same on the anvil, a staple-driving device movable with the bending and cutting device and situated below the same, a plate 48 fixed to the main plate and formed with a camway, a lever 45 engaging at its upper end in the camway and pivoted at its lower end to the ejector, a plate 64 connected with the main plate and formed with a camway, and a pendent lever 61 connected with the wire-feeding mechanism and engaging in the camway in the plate.

3. In a machine for forming and driving staples the combination of an anvil, a wire-feeding mechanism comprising opposing rolls adapted to advance the wire over the anvil, a vertically-reciprocating bending device comprising two fingers formed in their ends with grooves to receive the wire and adapted to straddle the anvil and bend the wire around, one of said fingers having an edge adapted to sever the wire, a vertical staple-guide arranged in advance of the anvil, a vertically-reciprocating staple-driver formed to enter said guide, a horizontal reciprocating ejector embracing the anvil and movable back and forth thereon in position to engage and push the staple into the guide, an operating-lever adapted to be operated by the vertical movement of the staple former and driver and pivoted to the ejector, and a second operating-lever connected with the feeding-rolls and actuated also by the reciprocating bending and driving devices.

4. The combination with the main reciprocating plate provided with a flange, of the bending slide-plate applied to the face of the main plate, clamping-screws extending through the flange and bearing on the edges of the slide-plate, a driving slide-plate 29 applied to the bending slide-plate, a through-bolt connecting said parts, and clamping-screws 31 extending through the flange and acting on the edges of the driving slide-plate.

5. The combination with an anvil and a vertically-movable bending-slide, of a cam-plate movable with said slide and formed with a slot extending rearward from its upper end, an ejector movable back and forth along the anvil, a vibratory lever 45 pivoted at its lower end to the ejector and engaging at its upper end in the cam-slot, a wire-feeding mechanism acting to advance the wire over the anvil, a plate 64, also movable with the bending-slide and formed with a camway extending laterally outward from its upper end and a pendent lever 61 operatively connected at its lower end with the wire-feeding mechanism and engaging between its ends in the cam in plate 64.

In testimony whereof I hereunto set my hand, this 4th day of February, 1898, in the presence of two attesting witnesses.

McCLINTOCK YOUNG.

Witnesses:
CHARLES E. RIORDON,
WILLIAM R. KENNEDY.